Figure 1:
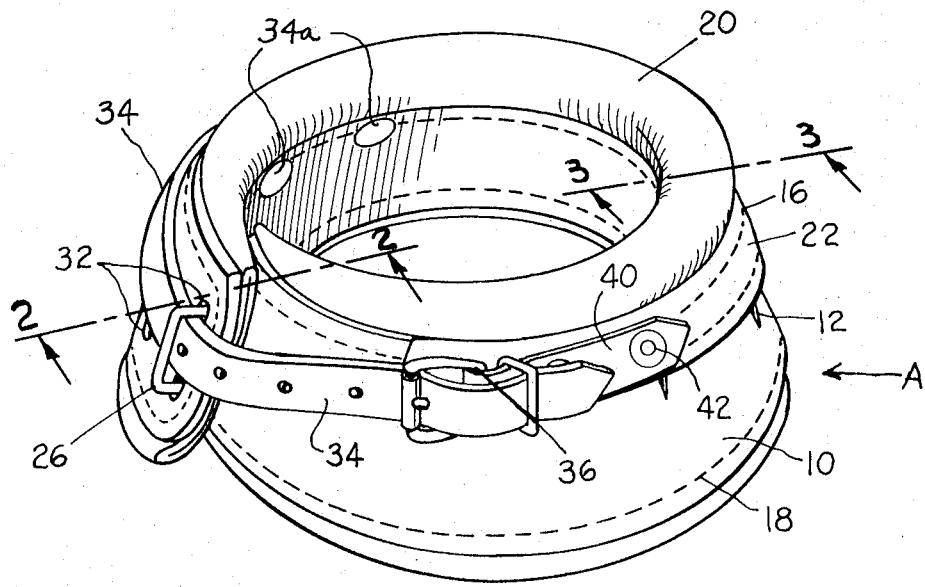

United States Patent [19]
Gregory

[11] 3,800,504
[45] Apr. 2, 1974

[54] HORSE BOOT

[76] Inventor: Francis W. Gregory, 7 Rose Garden, Taylors, S.C. 29687

[22] Filed: June 27, 1972

[21] Appl. No.: 266,646

[52] U.S. Cl. ................................................. 54/82
[51] Int. Cl. ............................................. B68c 5/00
[58] Field of Search ......................... 54/82; 168/25

[56] References Cited
UNITED STATES PATENTS
484,820   10/1892   Rahn ................................... 168/25
2,529,419   11/1950   Quartullo ............................. 168/25

Primary Examiner—Louis G. Mancene
Assistant Examiner—J. Q. Lever
Attorney, Agent, or Firm—Bailey & Dority

[57] ABSTRACT

A boot for use on the front leg of a horse for inducing the horse to raise his legs to a desired show position. The boot includes a mobile mass, which in one particular instance, shifts as the horse walks.

5 Claims, 10 Drawing Figures

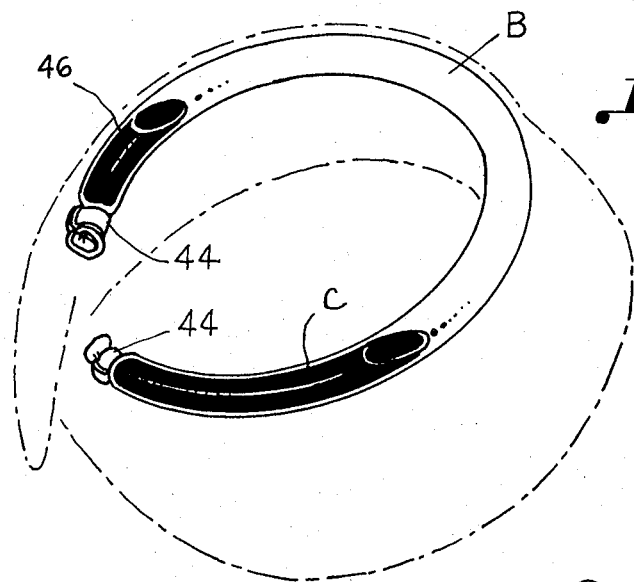
Fig. 4A.
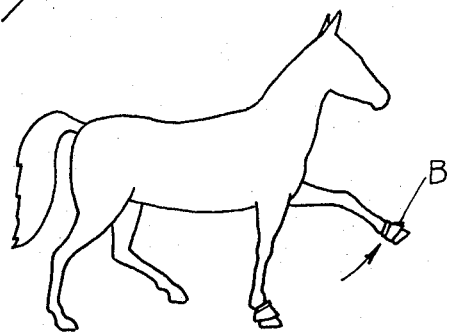
Fig. 5.
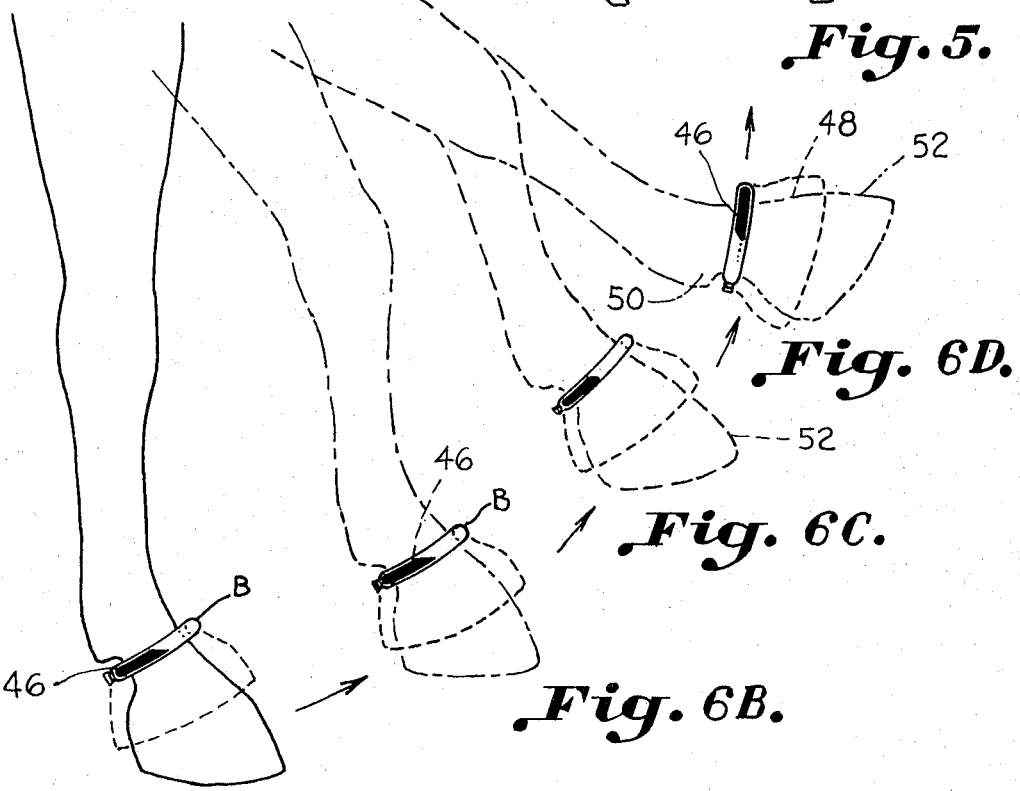
Fig. 6D.
Fig. 6C.
Fig. 6B.
Fig. 6A.

HORSE BOOT

This invention relates to a boot for a horse and more particularly to a boot used on special gated horses, such as walking horses, for inducing a horse to raise his front legs in an accentuated manner for the purpose of show.

In showing walking horses, such as a Tennessee Walker, the preferred front leg action of the horse is raising of the front legs during show higher than a normal untrained horse does when walking.

Heretofore, in order to cause the horse to raise his legs higher than normal various inhumane methods were utilized, such as chemically or mechanically injuring the legs or hoofs of the horse to make the same tender and, thus cause the horse to lift his legs higher due to pain.

Another means of inducing the horse to raise his legs in an accentuated manner incorporated a chain which is secured above the legs of the horse intermediate the fetlock and coronet of the leg in the pastern area. The frictional engagement of the chain with this tender area of the leg of a horse leads the horse to raise his leg higher with increased action in an attempt to throw the chain from the leg. Where chains are used in this manner, eventually injury to the leg of the horse will necessarily occur. Thus, inhumane methods have been outlawed by various horse show associations.

Accordingly, it is an important object of the present invention to provide a boot for a horse which induces the horse during show to raise his front legs in an accentuated manner without injuring the horse.

Another important object of the present invention is to provide a weighted boot for a horse which incorporates a mobile mass which shifts with the movement of the legs so that when the leg of the horse is extended outwardly the mass shifts to induce the horse to raise his leg even higher.

Another important object of the present invention is to provide a boot for a horse which incorporates a weight that is soft and pliable, minimizing injury to the tender area in the pastern portion of the horses leg.

Still another important object of the present invention is to provide a weighted boot for a horse which utilizes a strap arrangement which aids in preventing the boot from sagging when soaked with perspiration from the horse.

Figures 2, 3:
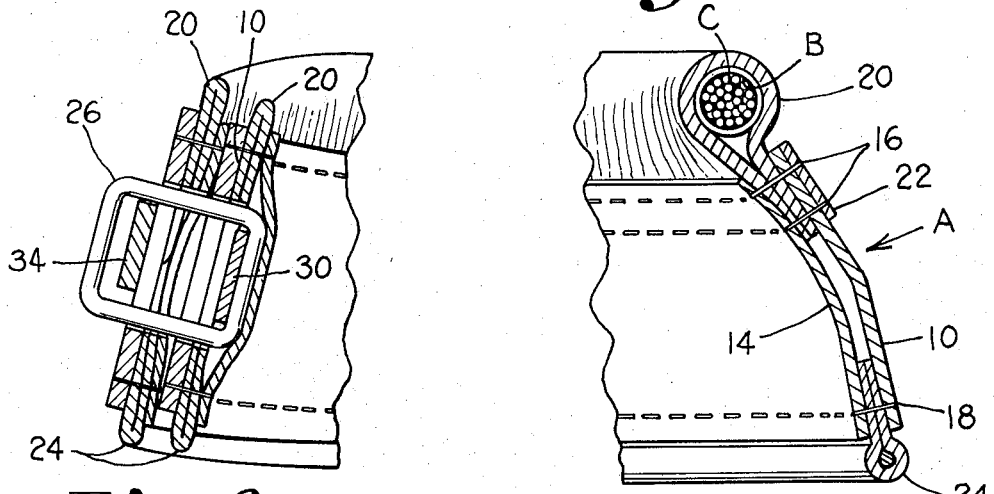
Figure 4:
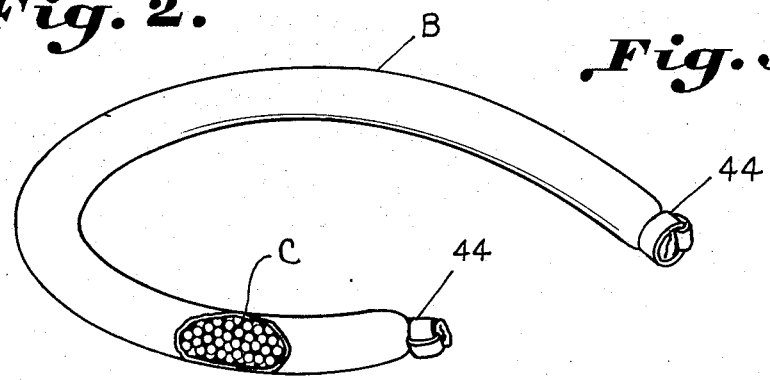

Other objects and advantages of this invention will become more apparent from a reading of the following detailed description and appended claims, taken in conjunction with the accompanying drawings wherein:

FIG. 1 is a perspective view illustrating a boot in accordance with the present invention, FIG. 2 is a transverse sectional view taken along the line 2—2 of FIG. 1, FIG. 3 is a transverse sectional view taken along the line 3—3 of FIG. 1, FIG. 4 is an enlarged perspective view illustrating a weighted tubular member utilized in the boot illustrated in FIG. 1, FIG. 4A is an enlarged perspective view illustrating still another type of weighted tubular member utilized in the boot illustrated in FIG. 1, FIG. 5 is a diagrammatic view illustrating a boot constructed in accordance with the present invention carried on the front legs of horse, and FIGS. 6A through 6D illustrate the various positions of a front leg of a horse while walking and the position of the mobile mass, such as illustrated in FIG. 4 at the various positions of the leg.

Referring in more detail to the drawings, the boot has a main body portion A for encircling the pastern portion of the leg of a horse. An elongated sealed tubular member B is carried by the main body portion A. A mobile mass C is carried in the tubular member B adjacent the top of the main body portion. In one embodiment the mobile mass includes a fluid with lead shots carried therein. In another embodiment the mobile mass includes liquid mercury which shifts as the leg is moved when the horse walks.

The main body portion A of the boot is constructed of leather and includes an elongated outer band 10 which has spaced vertical slits 12 therein, so that when the ends of the main body portion A are brought together in the manner illustrated in FIG. 1, such is generally conical and bell shaped. The outer band 10 is secured to an inner leather band 14 by stitching 16, adjacent the top of the inner and outer bands 10 and 14, respectively, and stitching 18 adjacent the bottom thereof. Carried adjacent the top of the inner and outer bands 10 and 14 is a loop of leather 20 which has the lower end thereof secured between the inner and outer bands by the stitching 16. A reinforcing strip 22 is provided adjacent the top of the outer band 10 for strengthening the boot. Another loop of leather 24 is stitched between the lower edges of the inner and outer bands 10 and 14 for aiding in maintaining the desired bell shape of the boot. Carried adjacent one end of the elongated main body portion is a metallic rectangular ring 26 that is secured adjacent the end of the main body portion by brads (not shown), extending through an elongated reinforcing strip 30 and the outer band 10. The other end of the main body portion has spaced vertical slots 32 positioned therein through which the ring 26 extends to obtain the desired diameter of the boot. The ends of the main body portion of the boot are secured together by a strap 34 which is attached adjacent one end by brads 34a. The strap 34 extends through the ring 26 and is attached to a buckle 36 carried adjacent the other end of the main body portion A. The buckle 36 is, in turn, secured to the main body portion A by a strap 40 and brad 42. As can be seen in FIG. 1, the buckle is carried adjacent the top of the outer band 10 so that the strap 34 extends downwardly to the center of the outer band, through the ring 26, and is secured by brads adjacent the top of the outer band on the other side of the main body portion A. Such aids in maintaining the desired bell shape of the boot even when such becomes saturated with perspiration from the horse.

The elongated sealed tubular member B, in one particular embodiment, includes a flexible plastic tube which has its ends sealed with a metal clamp 44. Positioned within the tube are lead shots having a diameter of approximately one-sixteenth inch. Conventional motor oil is used to fills the tube so as to prevent rattling of the lead shots, as well as to make the entire mass soft and mobile.

In FIG. 4A instead of placing the lead shots and oil within the plastic tube, liquid mercury 46 is placed in the tube. The liquid mercury 46 only fill approximately one-third of the tube so that it is allowed to shift within the tube, depending on gravity and kinetic energy.

As can be seen in FIG. 5, the boot is strapped around the leg of the horse encircling the pastern joint between the coronet and fetlock. The bell of the boot extends over the hoofs 52 of the horse. The bell shape of the boot prevents the boot from jamming on the hoof, and provides more action causing the horse to reach further.

Referring to FIGS. 6A through 6D, when the horse has its hoof on the ground the mercury 46 is carried on the lower side of the leg adjacent the bottom of the tube, as shown in FIG. 6A. The mercury remains in this position as the horse raises its leg through position 6B and 6C until its leg stops at the extended position shown in 6D. When the horse stops raising his leg at approximately the position shown in FIG. 6D, kinetic energy causes the mercury 46 to continue moving upwardly. The shifting of the mercury induces the horse to raise his leg higher before starting to lower his leg.

When the tubular member D is filled with oil and lead shots one theory as to why the horse is induced to raise his leg higher is that he is attempting to step out of the boot. The leather loop in which the tubular member B is carried is relatively soft so as not to chaff or rub the leg of the horse excessively while walking.

While a preferred embodiment of the invention has been described using specific terms, such description is for illustrative purposes only, and it is to be understood that changes and variations may be made without departing from the spirit or scope of the following claims.

What is claimed is:

1. A boot for use on the front leg of a horse for inducing the horse to raise his legs to a desired show position as the horse is walking comprising a main body portion for encircling the pastern portion of the leg of a horse, an elongated sealed tubular member attached adjacent a top portion of said main body portion encircling the pastern portion of the leg, a fluid carried in said tubular member, and lead shots carried in said fluid producing a mobile mass.

2. The boot as set forth in claim 1, wherein said main body portion is an elongated member with the ends brought together to define a generally conical shape, and said tubular member is encased in pliable leather.

3. A boot for use on the front leg of a horse for inducing the horse to raise his legs to a desired show position as the horse is walking comprising: a main body portion for encircling the pastern portion of the leg of the horse, an elongated sealed tubular member extending around said main body portion, fluid means carried in said tubular member producing a mobile mass and adding weight to said boot for inducing said horse to raise his front legs when walking.

4. The boot as set forth in claim 3, wherein said fluid means is liquid mercury.

5. A boot for use on the front leg of a horse for inducing the horse to raise his legs to a desired show position as the horse is walking comprising: a main body position for encircling the pastern portion of the leg of the horse, an elongated sealed tubular member carried by said main body portion, liquid mercury partially filling said tubular means so that said mercury is permitted to shift as said horse walks.

* * * * *